S. E. RAWLS.
TRACK MOWER.
APPLICATION FILED JUNE 3, 1919.
1,358,112.
Patented Nov. 9, 1920.
2 SHEETS—SHEET 1.
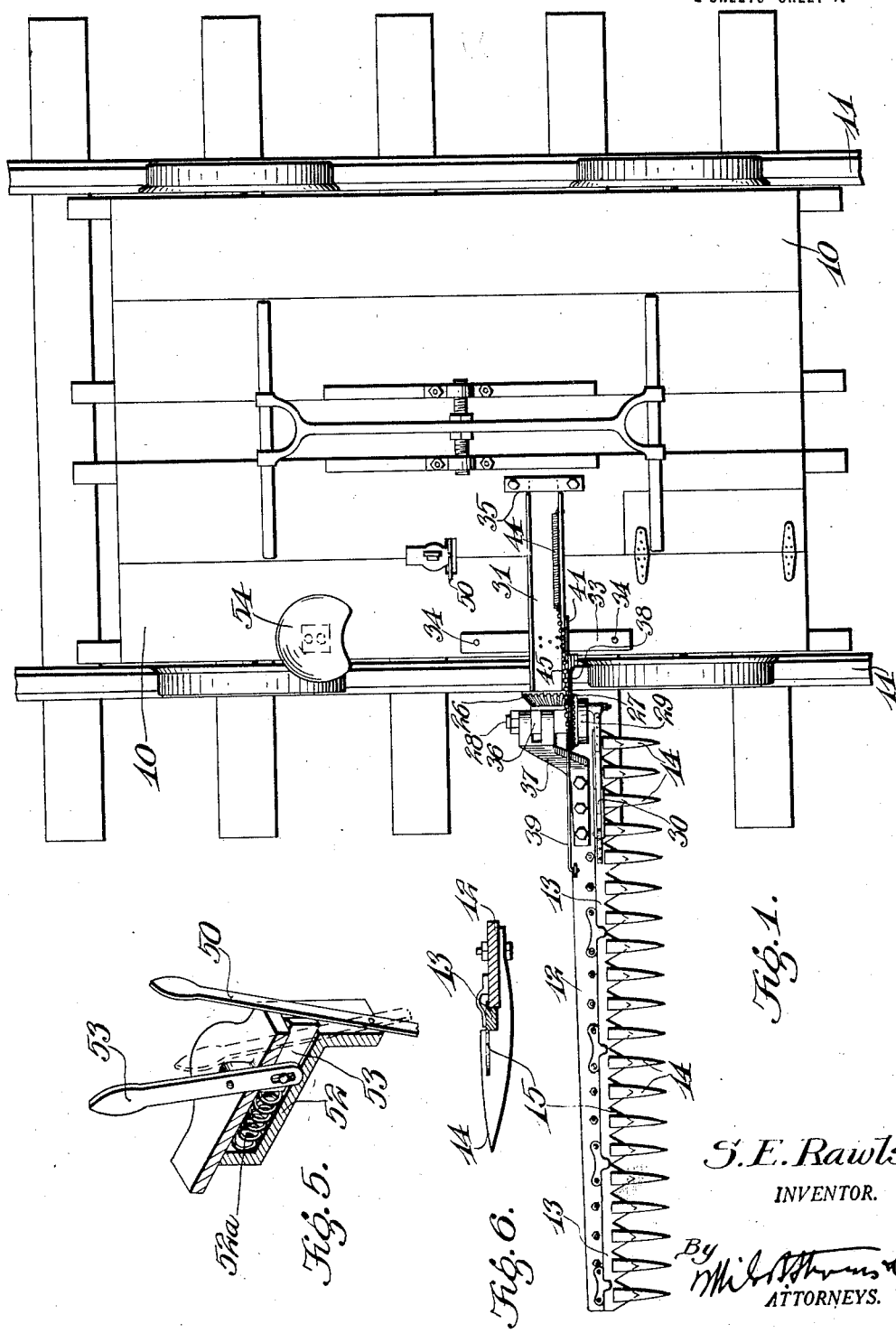

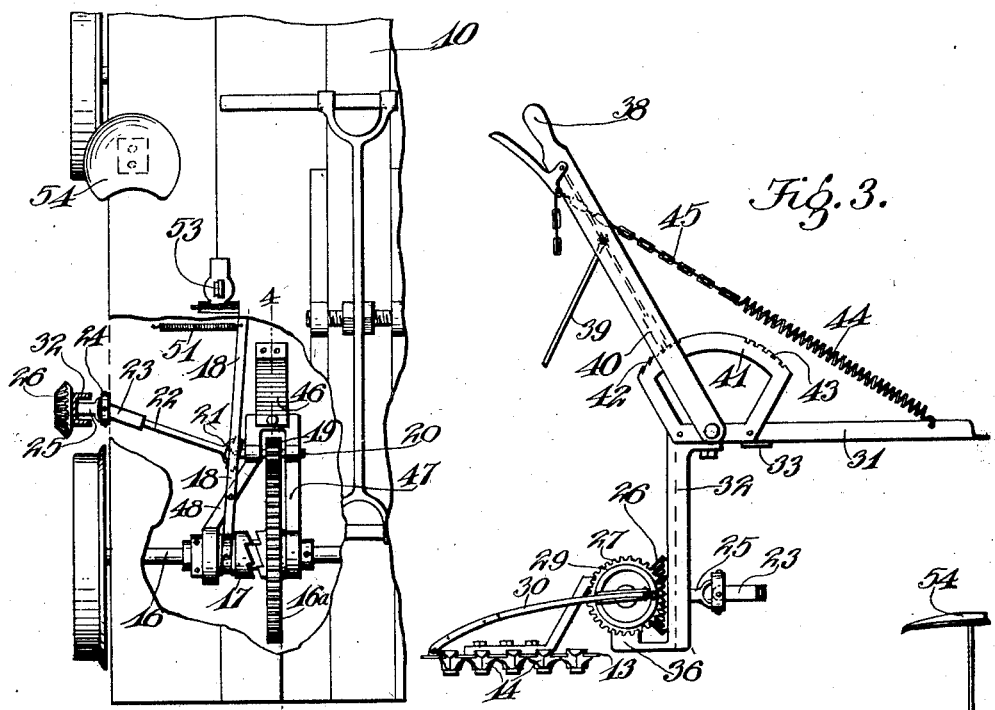

UNITED STATES PATENT OFFICE.

SILAS E. RAWLS, OF CHICAGO, ILLINOIS.

TRACK-MOWER.

1,358,112. Specification of Letters Patent. Patented Nov. 9, 1920.

Application filed June 3, 1919. Serial No. 301,401.

*To all whom it may concern:*

Be it known that I, SILAS E. RAWLS, a citizen of the United States, residing at Chicago, in the county of Cook and State of Illinois, have invented new and useful Improvements in Track-Mowers, of which the following is a specification.

This invention relates to mowing machines designed more particularly for cutting grass and weeds growing along the sides of railway tracks.

The invention has for its object to provide in a machine of this kind a novel and improved mounting of the mower unit whereby all danger of injury thereto, if it should meet with obstructions, is eliminated, the unit being automatically disconnected from its support if the attendant should fail to elevate it to clear the obstruction.

The object stated is attained by means of a combination and arrangement of parts to be hereinafter described and claimed, and in order that the same may be better understood, reference is had to the accompanying drawings, forming a part of this specification.

The preferred embodiment of the invention has been illustrated, but it will be evident that various changes and modifications in the structural details may be made without a departure from the spirit and scope of the invention as claimed hereinafter.

In the drawings,

Figure 1 is a plan view of the invention;

Fig. 2 is a plan view of certain portions of the mower-operating gearing;

Fig. 3 is an elevation of the mechanism by which the mower unit may be raised or lowered;

Fig. 4 is a section on the line 4—4 of Fig. 3;

Fig. 5 is a detail in perspective of a clutch control, and

Fig. 6 is a cross section of the cutting mechanism of the mower unit.

Referring specifically to the drawings 10 denotes the platform of a hand car on which the entire mechanism is mounted, said car running on the rails 11 of the track and the mower unit extending from one side of the car to operate on the road bed when the car is propelled. It will be understood, of course, that some other suitable wheeled supporting frame may be employed for carrying the mower mechanism, and the same may also be power-driven.

The cutting mechanism is similar to that of a mowing machine, the same comprising a cutter bar 12 carrying a reciprocating knife bar 13, and provided with guard fingers 14 and blades 15. The reciprocating knife bar is driven from one of the axles 16 of the car by a mechanism which will now be described.

On the axle 16 is a loose spur gear $16^a$ which is adapted to be driven by suitable clutch member 17 controlled by a lever 18. The gear $16^a$ is in mesh with a pinion 19 on a short shaft 20 flexibly connected by a universal joint 21 to a shaft which is in two longitudinally slidably connected sections 22 and 23, respectively, said sections being angular so that they turn together, the section 22 telescoping into the section 23. The section 23 is flexibly connected, by a universal joint 24, to a short shaft 25 provided with a bevel gear 26 which is in mesh with a bevel gear 27 on a shaft 28 carrying a wrist wheel 29 which operates the reciprocating knife bar 13 through the usual pitman connection 30.

On the platform 10 of the car is mounted a channeled beam 31 which projects at one end from one side of the platform and here carries a depending bracket arm 32. The beam carries a stout cross strip 33 on its under side which is fastened to the platform by two wooden pins or other frangible fasteners 34, whereby the beam is fastened down to the platform. The inner end of the beam seats loosely beneath a keeper strap 35.

The bracket arm 32 has bearings 36 supporting the shaft 25, and also supports the cutter bar 12 through a suitable brace 37.

The beam 31 supports a hand lever 38 having a connection 39 with the cutter bar 12 so that the latter may be lowered into operating position, and also swung upward to clear obstructions. The lever 38 is locked by a latch 40 engageable with a toothed sector 41 as usual.

If the attendant should fail to elevate the cutter bar 12 to clear an obstruction, no damage will be done as the pins 34 would be sheared off and the beam 31 would then slip out of the keeper 35 and off the platform 10, precipitating the mower unit on the ground alongside the track. This action is rendered possible for the reason that the shaft sections 22 and 23 are separably connected, and the section 23 slides off the section 22 to release the mower unit from the driving means.

The outer portion of the sector 41 has ratchet teeth 42 to allow the mower unit to rise over small obstructions of itself by pushing up on the connection 39, the same being a rigid rod, and also to allow the attendant to station the cutter bar 12 at any angle that the ground at the side of the track may assume. The teeth 43 at the inner end of the sector 41 are square to firmly hold the mower unit in elevated position when not in operation.

A spring 44 is anchored at one end to the beam 31 and connected at its other end by a chain 45 to the hand lever 38, for yieldingly resisting the drop of the mower unit as the attendant handles the hand lever. The spring acts as a counter weight to relieve the attendant of the weight of the mower unit while adjusting the same as to height from the ground.

On the under side of the platform is mounted a suitable hanger 46 supporting the shaft 20 and having arms 47 and 48 supported by the axle 16. The clutch lever 18 is fulcrumed on the arm 48.

The clutch lever 18 is pivotally connected, as shown at 49, to an upright hand lever 50 to which is connected a spring 51 for swinging the same in a direction to disengage the clutch 17. On the under side of the platform 10 is mounted a housing 52 inclosing a latch bolt 53 adapted to be advanced to come across one side of the lever 50 when it is swung to engage the clutch, and thus hold the clutch in. Upon retracting the latch bolt, the spring 51 swings the lever to disengage the clutch. The latch bolt is advanced by a spring 52$^a$ behind the same, and it is retracted by a hand lever 53.

The platform 10 also carries a seat 54 for the attendant of the mower unit.

I claim:

1. A track mower comprising a wheeled support, a mower unit carried by the support, a frangible fastening means securing the mower unit to the support, and a driving means for the mower unit having separable sections.

2. A track mower comprising a wheeled support, a mower unit carried by the support, a frangible fastening means securing the mower unit to the support, a drive shaft for the mower comprising separably connected sections, one of the sections being operatively connected to the mower unit for driving the same, and driving means for the other shaft section.

3. A track mower comprising a wheeled support, a frame carried by the support, a frangible fastening means securing the frame to the support, a mower unit carried by the frame, a drive shaft for the mower unit comprising separably connected sections, one of the sections being carried by the frame and operatively connected to the mower unit for driving the same, and driving means for the other shaft section.

4. A track mower comprising a wheeled support, a frame carried by the support, a frangible fastening means securing the frame to the support, a mower unit carried by the frame, a drive shaft for the mower unit, a shaft having a driving and separable connection with said shaft, and driving means for the second mentioned shaft.

In testimony whereof I affix my signature.

SILAS E. RAWLS.